Sept. 11, 1928.  1,683,953
T. B. CARR
MULTIPLE TEMPLATE
Filed April 22, 1927   2 Sheets-Sheet 2
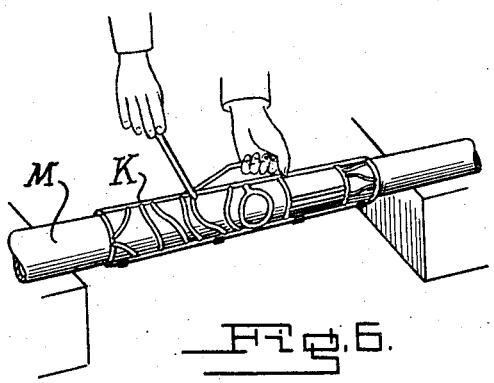
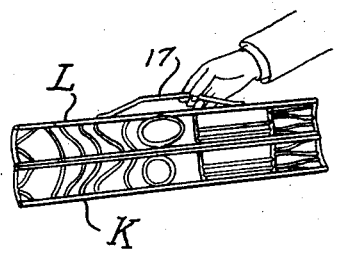
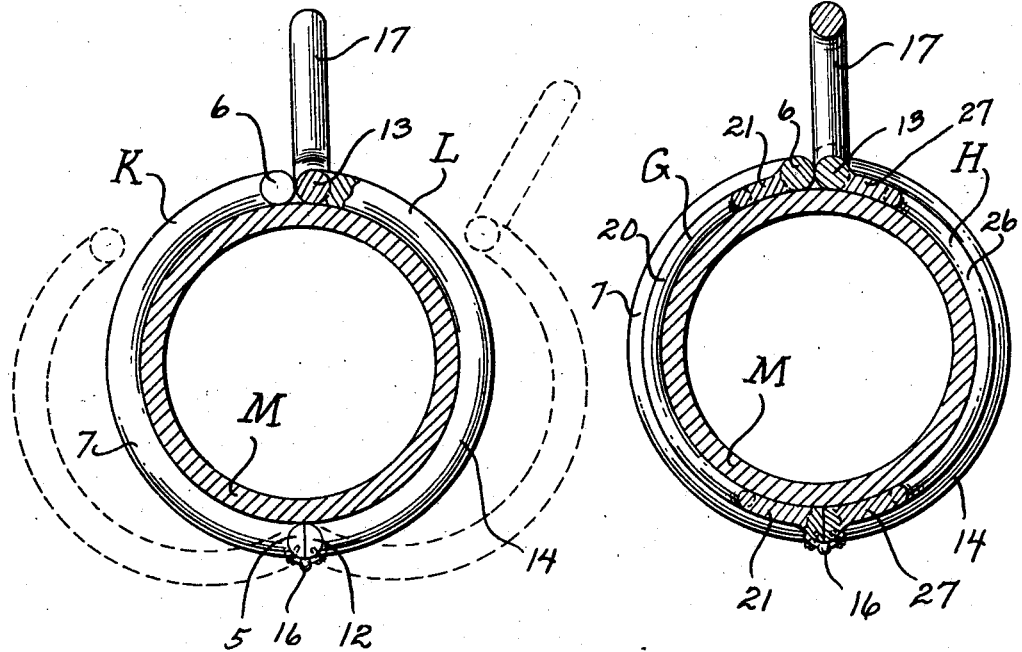
Thomas B. Carr
Inventor Patented Sept. 11, 1928.

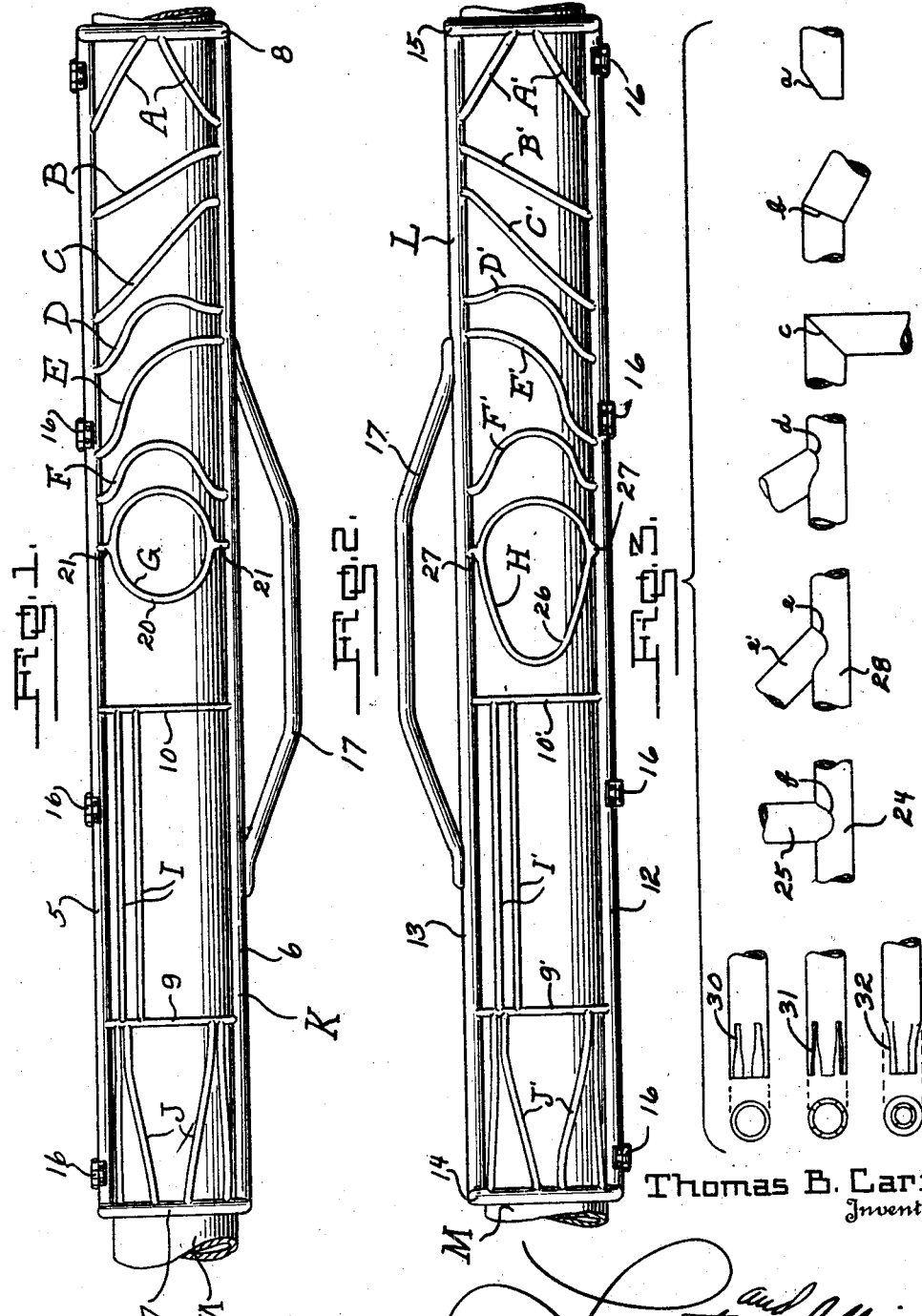

1,683,953

UNITED STATES PATENT OFFICE.

THOMAS B. CARR, OF MIDWEST, WYOMING.

MULTIPLE TEMPLATE.

Application filed April 22, 1927. Serial No. 185,847.

The present invention relates to templates and the primary object of the invention resides in the provision of a template for use in laying out patterns upon cylindrical objects such as pipes or cylindrical rods of various descriptions for the performing of desired cuts.

A further object of the invention is to provide a cylindrical template for use in marking pipes or other cylindrical objects in a manner whereby the objects may be cut in various manners for accurate end to end fitting at various angles or cut in a manner for conforming to the external surface of cylindrical objects of a like diameter.

A further object of the invention is to provide a multiple cylindrical template adapted to be disposed about a cylindrical object such as a pipe, and embodying features whereby one section of pipe may have an opening layout marked thereon and a second pipe section have a marking formed thereon whereby its end formation when cut will conform to the opening layout and external surface of the pipe section in which the opening is to be formed.

A still further object of the invention is to provide a cylindrical template comprising hinge sections for ready positioning about a pipe section, and embodying means whereby the pipe section may be marked and cut for reducing the diameter of the pipe various degrees.

Other objects and advantages of the invention will be apparent during the course of the following detailed description, taken in connection with the accompanying drawings forming a part of this specification and in which drawings:

Figure 1 is a side elevation of the improved template shown applied to a pipe section.

Figure 2 is a plan view of the opposite side of the template shown applied to a pipe section.

Figure 3 illustrates by way of example the various cuts which may be made from the markings formed by the template.

Figure 4 is a perspective view showing the manner of use of the improved template.

Fig. 5 is a perspective view of the template shown in an open position.

Figure 6 is an enlarged end elevation of the template and showing the manner in which the same may be positioned about a pipe section or other cylindrical object.

Figure 7 is a transverse section through the improved template shown applied about a pipe section.

Referring to the drawings in detail, and wherein similar reference characters designate corresponding parts throughout the several views, the improved multiple template has been shown as embodying a pair of companion semi-circular shaped sections K and L shown in position for performing the desired layout upon a pipe section or similar cylindrical object M.

Referring first to the section K, the same embodies a hinge rod 5 of semi-circular shape in cross section and an edge rod 6, the rods 5 and 6 being joined at their ends by semi-circular shaped end rods 7 and 8, and which rods 7 and 8 may be either secured as by welding or the like to the rods 5 and 6, or if so desired the rods 5 to 8 inclusive may be formed from a single continuous piece of material. Extending from the hinge rod 5 to the edge rod 6 adjacent one end of the template, are arcuate shaped cross rods 9 and 10 which aside from serving as spacers for the rods 5 and 6, act in a capacity to be subsequently set forth. Carried by the template section K, and arranged from end to end in the respective order given, is a series of dissimilarly formed gauge members A, B, C, D, E, F, G, I and J.

Referring now to the template section L, the same embodies a hinge rod 12 of semi-circular shape in cross section and an edge rod 13, the rods 12 and 13 being joined at their ends by means of semi-circular shaped end rods 14 and 15. The sections K and L are of a like length and are hinged together by means of suitable hinges 16 connected across the outer side of the semi-circular shaped hinge rods 5 and 12. The edge rod 13, preferably at its center, carries an offset handle 17 which is employed for retaining the sections in position about a cylindrical object in a manner as illustrated in Figure 4. As will be observed in Figure 4, the operator positions his fingers through the handle 17 and by placing the thumb upon the edge rod 6, the template sections are held in position about the cylindrical object to be marked. Connecting the rods 12 and 13 and in diametric relation to the rods 9 and 10, are cross rods 9' and 10' which align respectively with the rods 9 and 10 of the template section K. Carried by the template section L, is a series of gauge members A', B', C', D', E', F', H, I', and J' which align and cooperate with the gauge members of the template section K.

The gauge members of the respective sections conform to the shape of the end rods of the sections and are secured to their respective hinge and edge rods in a manner so that their inner surfaces will contact with the cylindrical object about which the template is disposed.

While the gauge members of the template may be developments of lines formed upon the exterior surface of a cylindrical object for laying out patterns of various descriptions for the performing of desired cuts, in the example shown the gauge members have been so shaped as to permit of cuts being performed for formation of various joints such as disclosed in Figure 3. The gauge members of the templates are preferably of wire like formation of a suitable gauge, but if so desired the gauge members may be of any preferred cross sectional configuration.

Referring first to the gauge wires A and A', and which also serve as braces for the template sections, these gauge wires may be employed for the making of a cut such as illustrated at "a" in Figure 3. The companion gauge wires B and B' will permit of a lay out being marked on a cylindrical body for providing an angular joint between two sections as illustrated at "b" in Figure 3. The cooperating gauge wires C and C' and which extend at an angle of 45° to the axis of the template, will permit of the right angular joints being formed between two pipe sections as illustrated at "c" in Figure 3. The cooperating gauge wires D and D' will permit of a marking being made upon a cylindrical surface which when the cylinder is cut along said marking may have its end face shaped to fit in surface contact the surface of a cylindrical object as illustrated at "d" in Figure 3. As will be observed, the companion gauge wires D and D' have reversed curves at their connection with their respective end and edge rods, and are offset in a general direction at their connections with the edge rods, toward the end rod 15. The cooperating gauge wires E and E', and which extend in a general direction like that of the gauge wires D and D', will permit of a cut being formed whereby the end formation of the cylindrical body may be disposed in surface contact with a cylindrical body as illustrated at "e" in Figure 3 for disposing the cylindrical section "e'" at a greater angle than that as illustrated at "d" in Figure 3. The cooperating gauge wires F and F' will mark the cylindrical body for making a right angular joint as illustrated at "f" in Figure 3 It will be noted in Figures 1 and 2 that the terminals of the gauge wires F and F' have reverse bends at their terminals and are joined to their respective hinge and edge rods at diametrically opposite points along the template. Thus it will be seen that the gauge wires D, D' and C, C' serve to mark the cylinder in a manner whereby the cylinder may be cut in various manners for accurate end to end fitting at various angles, while the gauge wires D, D'—E, E' and F, F' provide markings whereby the cylinder may be cut in a manner for conforming to the external surface of a cylinder of like diameter as illustrated at "d, e and f" in Figure 3.

The gauge member G which is carried by the template section K is of circular formation as at 20 and is connected at diametrically opposite points to the rods 5 and 6 by short spacing wires 21. This circular gauge member G serves for marking the pipe section 24 in Figure 3 whereby a passageway may be formed between the pipe section 24 and right angularly connected pipe section 25. As will be observed in Figure 7, the ring like portion 20 of the gauge member G conforms to the curve of the template section K.

The gauge member H and which is carried by the template section L comprises a body portion 26 of ovoid shape, connected adjacent its wider end by means of spacing wires or ribs 27 connected with the rods 12 and 13 in alignment transversely of the template. This ovoid shaped body portion 26 will permit of a marking being made upon a pipe such as at 28 in Figure 3 whereby an opening may be cut in the pipe section 28 for forming a passageway into the pipe section e'.

The gauge members I are in the form of gauge wires extending longitudinally of the template and connected at their opposite ends to the cross rods 9 and 10 and 9' and 10'. These longitudinally extending gauge wires I and I' serve for marking any desired longitudinal cuts or perforations to be made in the cylindrical objects and if desired may be so located as to mark diametrically opposite points on the cylindrical body. It may here be well to mention that the cross rods aside from serving as anchoring means for the longitudinal gauge wires I and I', will serve for marking the cylindrical body for a square cut.

The gauge wires or members J and J' and which are connected longitudinally of the template between the end rods 7 and 14 and rods 9 and 9', alternately extend in angular relation to one another in a manner whereby a pipe section may be marked as illustrated at 30 in Figure 3 and after which cut as at 31 and then drawn together as at 32 for reducing the diameter of the pipe to the desired external diameter.

Thus it will be seen that the gauge members of the template aside from permitting accurate cuts being made for end to end fitting at various angles cylindrical bodies, also permits of an end cut being made in a cylindrical body for conforming to the external surface of a cylindrical body of a like diameter.

The template may of course be made of various diameters in accordance with the diameter of the cylindrical body about which the template is to be disposed, and may be made of any desired length and incorporate more or less numbers of gauge members of various configurations other than that shown, in accordance with the specific type of work with which the template is to be used.

From the foregoing description it will be apparent that a novel and efficient multiple cylindrical template has been provided embodying hinged sections which may be readily disposed about cylindrical bodies to be marked for cutting, and embodying gauge members whereby the cylindrical bodies may be cut either for end to end connection or end to side connection with the end formation of one section conforming to the external cylindrical surface of the section with which it abuts.

Changes in detail may be made to the specific form of the invention herein shown and described, without departing from the spirit of the invention or the scope of the following claims.

I claim:

1. A device of the class described comprising a pair of template sections for positioning about a cylindrical body, and cooperative gauge members of unlike configurations carried by each template section for the producing of cuts for accurate end to end fitting of cylindrical bodies or producing an end cut to the cylindrical body conforming to the external surface of a cylindrical body of a like diameter.

2. A device of the class described comprising a pair of template sections for positioning about a cylindrical body, and cooperative gauge members carried by each template section in spaced relation throughout the length of the sections for the producing of patterns or different cuts to be performed on the cylindrical body.

3. A device of the class described comprising a pair of template sections of semi-circular shape in cross section and hingedly connected together along one edge for positioning about a cylindrical body, and gauge members carried by each template section for contact with the cylindrical body about which the sections are disposed.

4. A device of the class described comprising a pair of template sections each embodying a hinge and an edge rod and end rods of semi-circular shape connecting the terminals of companion hinge and edge rods for contact at their inner edges with a cylindrical body, a handle section carried by the edge rod of one of the sections, and cooperative gauge members carried by each template section and conforming to the arc of the end rods of the sections.

5. A template for marking cylindrical bodies, comprising a pair of companion sections embodying pivotally connected hinge rods and parallel edge rods, and gauge wires connected between the hinge rod and edge rod of each section and curved outwardly intermediate their ends for conforming to the cylindrical surface of the body about which the template is disposed.

6. In a template for marking cylindrical bodies, a pair of companion sections embodying pivotally connected hinge rods and parallel edge rods, and gauge wires connected between the hinge rod and edge rod of each section with the connection of the wires at one end to the hinge rod being offset in a like direction longitudinally of the template from the connection of the opposite ends of the gauge wires to the edge rods.

7. In a template for marking cylindrical bodies, a pair of companion sections embodying pivotally connected hinge rods and parallel edge rods, and a gauge wire connected between the hinge rod and edge rod of each section and curved outwardly intermediately their ends for conforming to the cylindrical surface of the body about which the template is disposed, said gauge wires being arcuated intermediate their ends longitudinally of the template and having reverse bends at their terminals for attachment to their respective hinge and edge rods in a plane at a right angle to the longitudinal axis of the template.

8. In a template for marking cylindrical bodies for producing a cut conforming to the external surface of a cylindrical body of a like diameter, a pair of hingedly connected sections each embodying a hinge rod and a parallel edge rod, and gauge wires connected between the hinge rod and edge rod of each section and having reverse bends at each end, said gauge wires at one end being connected at a like point along the hinge rods and at a like point along the edge rods in offset relation longitudinally of the template.

9. In a template for marking cylindrical bodies with apertures of ovoid shape, a template section embodying parallel spaced apart rods, for engaging the body at diametrically opposite points, a gauge member arranged between the rods embodying an ovoid shaped body portion arcuated transversely for conforming to the external surface of the cylindrical body and spacing ribs connecting the body to said parallel rods of the template section.

10. In a template for marking cylindrical bodies for reducing the diameter of the body, a pair of semi-circular shaped template sections embodying end rods and cross rods spaced from the end rods, and gauge wires connected between the end rods and cross rods and alternately extending in opposite directions to one another circumferentially of the template.

THOMAS B. CARR.